(12) United States Patent
Hellinger

(10) Patent No.: US 6,698,195 B1
(45) Date of Patent: Mar. 2, 2004

(54) HYDRODYNAMIC COUPLING

(75) Inventor: Walter Hellinger, Bad Mergentheim-Rot (DE)

(73) Assignee: Voith Turbo GmbH & Co. KG (DE)

( * ) Notice: Subject to any disclaimer, the term of this patent is extended or adjusted under 35 U.S.C. 154(b) by 0 days.

(21) Appl. No.: 09/889,343

(22) PCT Filed: Jan. 12, 2000

(86) PCT No.: PCT/EP00/00166

§ 371 (c)(1),
(2), (4) Date: Jan. 9, 2002

(87) PCT Pub. No.: WO00/42331

PCT Pub. Date: Jul. 20, 2000

(30) Foreign Application Priority Data

Jan. 15, 1999 (DE) .......................... 199 01 296

(51) Int. Cl.[7] .............................................. F16D 33/06
(52) U.S. Cl. .......................................... 60/357; 60/366
(58) Field of Search .......................... 60/340, 348, 357, 60/359, 363, 366

(56) References Cited

U.S. PATENT DOCUMENTS

| | | | |
|---|---|---|---|
| 2,987,887 A | * | 6/1961 | Fowler .......................... 60/357 |
| 3,934,687 A | | 1/1976 | Becker ........................ 192/3.23 |
| RE29,928 E | * | 3/1979 | Bopp .......................... 60/359 |
| 4,581,892 A | | 4/1986 | Ahrens .......................... 60/330 |
| 4,773,513 A | * | 9/1988 | Herrmann et al. .......... 188/296 |

FOREIGN PATENT DOCUMENTS

| | | |
|---|---|---|
| DE | 1039318 | 9/1956 |
| DE | 2147245 | 3/1972 |
| DE | 2437675 | 3/1975 |
| DE | 3329854 | 3/1985 |
| DE | 3545660 | 6/1987 |
| DE | 19521926 | 1/1996 |
| DE | 19706652 | 7/1998 |
| GB | 2145198 | 3/1985 |

* cited by examiner

*Primary Examiner*—Edward K. Look
*Assistant Examiner*—Michael Leslie
(74) *Attorney, Agent, or Firm*—Ostrolenk, Faber, Gerb & Soffen, LLP

(57) ABSTRACT

The invention relates to a flow-controlled, hydrodynamic coupling having an operating chamber (5.2) which is formed from a pump impeller (3.2) and a turbine impeller (4.2) and is intended for introducing an operating medium. In order to make it possible for the operating chamber to be completely filled at a slip of 100% even in the case of large torques which are to be transmitted, according to the invention the inlet (3.2.1) for introducing the operating medium into the operating chamber (5.2) is arranged at a point of the operating chamber (5.2) which is situated radially as far outward as possible.

10 Claims, 2 Drawing Sheets

HYDRODYNAMIC COUPLING

BACKGROUND OF THE INVENTION

The invention relates to a hydrodynamic coupling having a pump impeller and a turbine impeller which together form a toroidal operating chamber. The operating chamber is used to receive an operating medium, for example oil or water, which transmits a torque.

The invention relates to a hydrodynamic coupling having a pump impeller and a turbine impeller which together form a toroidal operating chamber. The operating chamber is used to receive an operating medium, for example oil or water, which transmits a torque.

There are hydrodynamic couplings which are continuously filled with operating medium—also referred to as constant couplings. However, there are also hydrodynamic couplings in which the operating chamber can be filled and emptied in a controllable manner—also referred to as flow-controlled and filling-controlled, hydrodynamic couplings. The invention is concerned with the last-mentioned type of coupling. A coupling of this type has been disclosed in DE 197 06 652 A1.

Hydrodynamic couplings are used to transmit a torque from a driving motor to a machine, for example from an electric motor to a grinding machine or to a conveying system. On account of the operating characteristics of a coupling of this type, the torque is transmitted from the motor to the machine in a very elastic manner. In particular when starting up, i.e. when the motor is rotating and the machine is at a standstill, the curve of the torque transmitted to the machine only rises slowly. If the driving motor is an electric motor then the latter is brought up to its nominal speed under no-load conditions.

Flow-controlled, hydrodynamic couplings are of particularly significantly used in the mining industry. Here they are connected, for example, between an electric motor and a conveyor belt. In this connection, an important application area is what are referred to as scraper chain conveyors. In this case too the coupling ensures a gentle transmission of torque, specifically not only in the starting-up phase, but also when the scraper conveyor is running, namely if the scraper conveyor comes up against particularly hard material during its operation.

In the meantime, the motors have been developed further. The tilting moment of the motors has been increased. However, the couplings of the previous type of construction cannot produce this increased tilting moment, so that torque is not transmitted to a sufficient extent from the motor to the machine.

SUMMARY OF THE INVENTION

The invention is based on the object of designing a driving device having a motor and a flow-controlled, hydrodynamic coupling in such a manner that during the starting-up operation sufficient torque is transmitted from the motor to the machine even if the load exerted by the machine is very high.

This object is achieved by a flow-controlled, hydrodynamic coupling having an operating chamber which is formed from a pump impeller and a turbine impeller and is intended for introducing an operating medium. In order to make it possible for the operating chamber to be completely filled at a slip of 100% even in the case of large torques which are to be transmitted, according to the invention the inlet for introducing the operating medium into the operating chamber is arranged at a point of the operating chamber which is situated radially as far outward as possible. The inventor has found the following in particular: in the outlined conditions, where the slip is 100 percent, the operating chamber is not filled to the required amount. Rather, only partial filling is achieved.

The inventor has also found the reasons for this: in the case of the flow-controlled, hydrodynamic couplings which have previously been known, operating medium is supplied to the operating chamber of the coupling over a relatively small radius. If the operating chamber is still empty the supply of operating medium to the operating chamber does not cause any problems. However, as the degree of filling rises, a dynamic pressure builds up in the operating chamber. This acts counter to the pressure of the supplied medium and increasingly hinders the admission of further operating medium, so that complete filling of the operating chamber does not happen at all. However, the further the inlet for the operating medium into the operating chamber is placed radially outward, the greater is the rotational pressure of the inflowing operating medium. This relatively great rotational pressure can overcome the hydrodynamic pressure in the operating chamber. This enables complete filling of the operating chamber to be achieved and therefore transmission of a sufficiently large torque from the driving motor to the machine, for example to the scraper chain conveyor mentioned.

The inlet does not absolutely have to lie on the largest radius, i.e. in the vertex of the operating chamber. However, it should lie in the region of the vertex of the operating chamber.

With the design according to the invention of a flow-controlled, hydrodynamic coupling, a scraper chain conveyor, for example, can be started up from a standstill without any problem even if extremely large amounts of coal have fallen into its collecting region.

BRIEF DESCRIPTION OF THE DRAWINGS

The invention and the prior art are explained in greater detail with reference to the drawing. Specifically, the following is illustrated.

DESCRIPTION OF A PREFERRED EMBODIMENT AND A PRIOR ART EMBODIMENT

Figure 1:
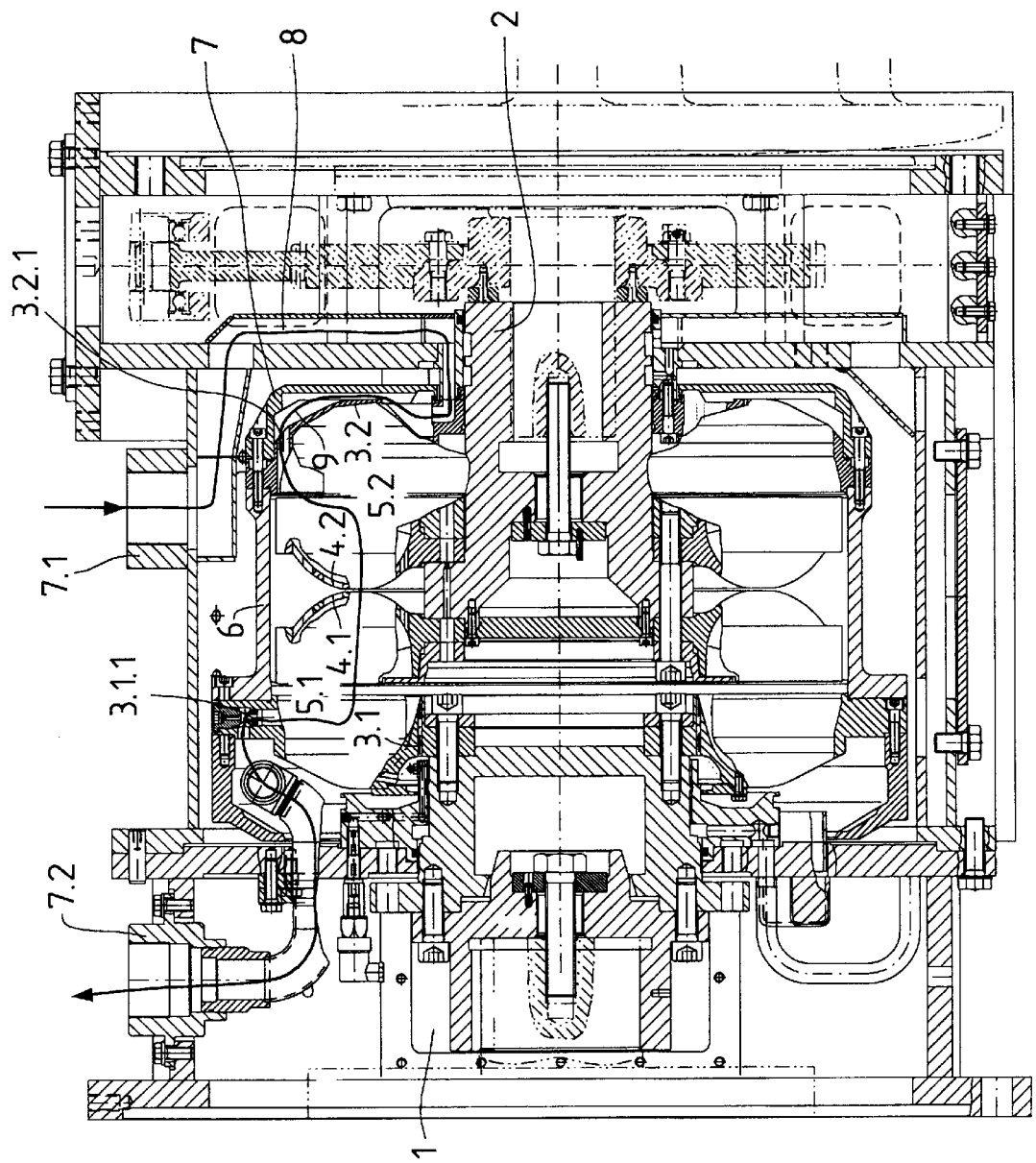
FIG. 1 shows a flow-controlled, hydrodynamic coupling according to the invention in an axial section.

The coupling illustrated in FIG. 1 is of duplex type of construction.

The coupling has a driveshaft 1 and a driven shaft 2. The driveshaft 1 is connected in a rotationally fixed manner to a first pump impeller 3.1, and further—via a cylindrical wall 6, to a second pump impeller 3.2. The second pump impeller 3.2 is connected in a rotationally fixed manner to the cylindrical wall 6.

The driven shaft 2 bears a first turbine impeller 4.1 and a second turbine impeller 4.2.

The impeller pairs 3.1, 4.1 and 3.2, 4.2 together form a respective operating chamber 5.1, 5.2.

The revolving components mentioned are surrounded by a housing 7. The housing has a housing inlet 7.1 and a housing outlet 7.2 for an operating medium. The latter may, for example, be water or oil.

What is referred to as the coupling bushing 8 is connected in a rotationally fixed manner to the pump impeller 3.2. The said coupling bushing forms together with the pump impeller 3.2 a flow channel 9.

A hole 3.2.1 is crucial for the invention. This hole produces a conducting connection between the flow channel 9 and operating chamber 5.2. The hole 3.2.1 can run parallel to the axis or inclined with respect to the axis of the machine. It can furthermore be of nozzle-like design downstream.

The pump impeller 3.1 is assigned an outlet valve 3.1.1.

The operating medium is supplied to the coupling by an outer circuit (not illustrated here). The circuit comprises in a known manner a cooling apparatus, a regulator and other known units.

The operating medium is introduced into the housing through the housing inlet 7.1. Within the housing it then flows radially inward almost as far as the driven shaft 2. From there it enters into the flow channel 9, passes through the transverse hole 3.2.1 into the operating chamber 5.2, from there into the operating chamber 5.1 and from there via valve 3.1.1 to the housing outlet 7.2.

The arrangement of the transverse hole 3.2.1 in a radially outer region of the operating chamber 5.2—here in the region of the vertex of this operating chamber—makes it possible to completely fill the operating chamber 5.2 and also the operating chamber 5.1 with operating medium.

Figure 2:
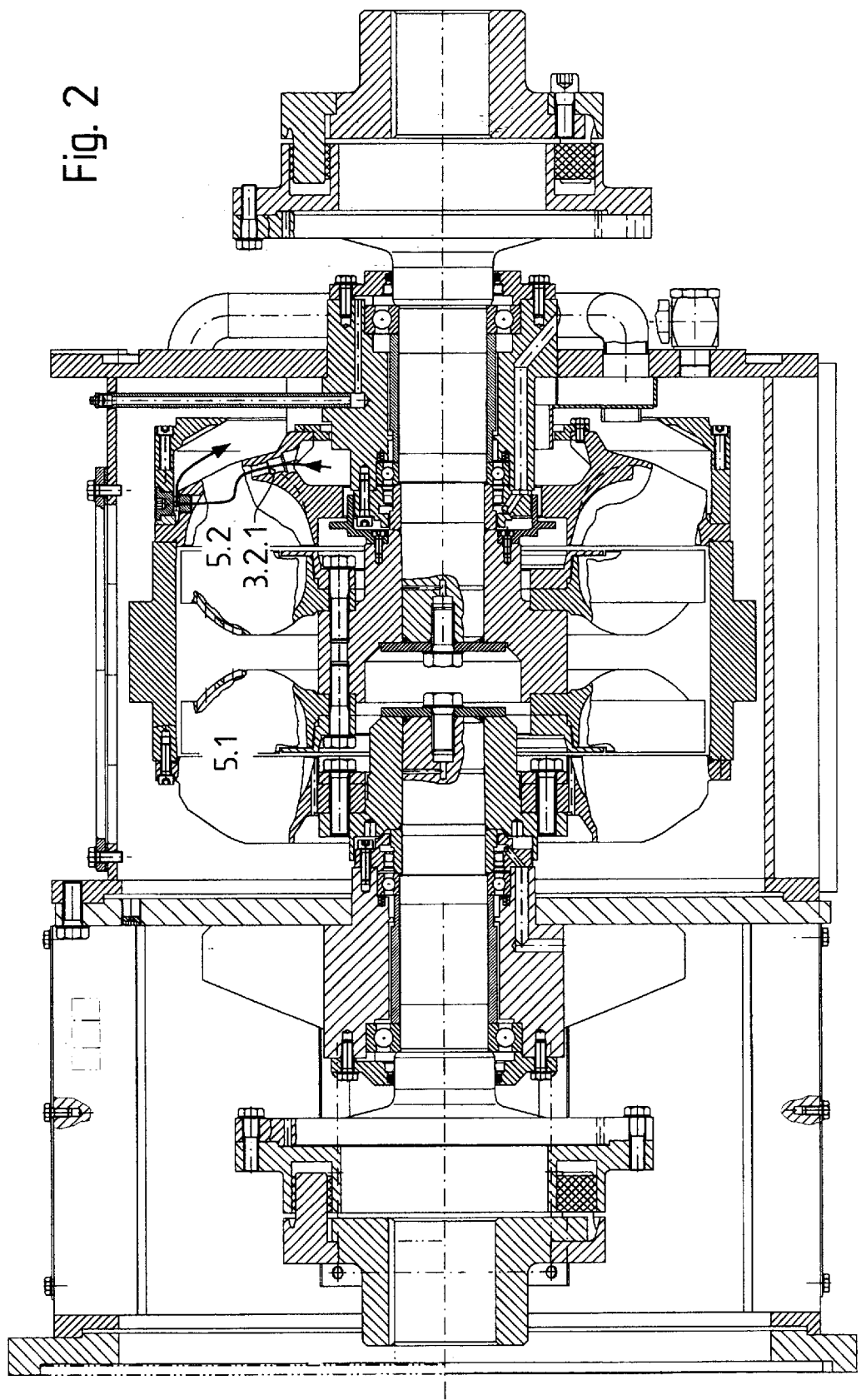
FIG. 2 shows a flow-controlled, hydrodynamic coupling according to the prior art, again in an axial section.

The embodiment which is illustrated in FIG. 2 of a previously known, hydrodynamic flow coupling is again a duplex coupling. The crucial difference as compared with the coupling according to the invention is that the inlet 3.2.1 into the operating chamber 5.2 lies on a substantially smaller radius. In this case, complete filling of the operating chambers 5.2, 5.1 at a slip of 100 percent and with great load is possible only with difficulty, if at all.

What is claimed is:

1. A flow controlled hydrodynamic coupling, comprising:

a rotatable pump impeller; a drive shaft connected with the pump impeller for rotating the pump impeller;

a turbine impeller spaced from the pump impeller; a driven shaft connected to the turbine impeller for being rotated by the turbine impeller;

the pump impeller and the turbine impeller being so placed with respect to each other and so shaped as together to define a toroidal operating chamber into which the pump impeller and the turbine impeller communicate and into which operating medium may be filled for coupling the pump impeller to the turbine impeller by the operating medium; the operating chamber defined by the impellers having regions of greatest and lesser radius with respect to an axis of the rotation of the impellers;

an outer circuit for supplying a fluid operating medium; a chamber inlet communicating from the outer circuit into the operating chamber;

a housing surrounding and spaced out from the impellers, a housing inlet into the housing for receiving operating medium, and a housing outlet from the housing and spaced from the housing inlet for exit of the operating medium from the housing; and the inlet to the operating chamber being from inside the housing and past one of the impellers defining the operating chamber and being located at the region of greatest radius of the operating chamber.

2. The coupling of claim 1, wherein the housing inlet is at an axial region along the housing in the vicinity of the driven shaft; and the housing outlet is at an axial region along the housing in the vicinity of the drive shaft.

3. The coupling of claim 1, wherein the impellers are rotatable on the axis which is a common axis.

4. The coupling of claim 1, further comprising a coupling bushing connected rotationally with the pump impeller and positioned outside the pump impeller;

a flow channel being defined between the coupling bushing and the pump impeller, the flow channel having a downstream end; and the inlet into the operating chamber is an operating medium conducting connection between the downstream end of the flow channel and the operating chamber.

5. The coupling of claim 4, wherein the turbine impeller includes a region radially outwardly of the pump impeller and the inlet to the operating chamber is through the turbine impeller.

6. The coupling of claim 4, wherein each of the pump impeller and the turbine impeller is comprised of a respective duplex arrangement, including first and second spaced apart pump impellers on a first common axis and first and second turbine impellers on a second common axis, with the first pump and turbine impellers being so shaped as to define a first operating chamber at the first duplex arrangement and the second pump and turbine impellers being so shaped as to define a second operating chamber at the second duplex arrangement, wherein pump impellers cooperate for communicating energy to the respective turbine impellers;

the coupling bushing, the flow channel defined thereat and the inlet into both of the first and second operating chambers for introducing operating medium therein are positioned at the second of the operating chambers which is situated in the vicinity of the shaft driven by the turbine impeller.

7. The coupling of claim 6, wherein the housing inlet is at an axial region along the housing in the vicinity of the driven shaft.

8. The coupling of claim 7, wherein the housing outlet is at an axial region along the housing in the vicinity of the drive shaft.

9. The coupling of claim 6, wherein each of the duplex arrangements defined by one of the first and second pump impellers and the respective turbine impeller is a generally toroidal shaped chamber.

10. The coupling of claim 6, wherein all the impellers are rotatable on a common axis.

* * * * *